(12) United States Patent
Drake et al.

(10) Patent No.: US 9,689,756 B2
(45) Date of Patent: Jun. 27, 2017

(54) TOOL AND METHOD FOR USE IN MEASURING A PRESSURE INDUCED BY A BIASING MEMBER ON A SURFACE

(71) Applicant: The Boeing Company, Huntington Beach, CA (US)

(72) Inventors: Ryan F. Drake, Marysville, WA (US); Steven P. Kury, Everett, WA (US); James P. Conners, Clinton, WA (US)

(73) Assignee: The Boeing Company, Chicago, IL (US)

( * ) Notice: Subject to any disclaimer, the term of this patent is extended or adjusted under 35 U.S.C. 154(b) by 260 days.

(21) Appl. No.: 14/510,709

(22) Filed: Oct. 9, 2014

(65) Prior Publication Data

US 2016/0103025 A1    Apr. 14, 2016

(51) Int. Cl.
*G01L 1/04* (2006.01)

(52) U.S. Cl.
CPC ..................... *G01L 1/04* (2013.01)

(58) Field of Classification Search
None
See application file for complete search history.

(56) References Cited

U.S. PATENT DOCUMENTS

| | | | |
|---|---|---|---|
| 3,115,035 A | 12/1963 | Schroeder | |
| 4,321,833 A * | 3/1982 | Zeiringer | F02M 65/003 73/730 |
| 4,374,477 A * | 2/1983 | Kikuchi | G01F 1/667 310/346 |
| 4,432,231 A * | 2/1984 | Napp | G01F 23/296 128/DIG. 13 |
| 4,541,284 A * | 9/1985 | Guagliumi | F02M 65/003 73/730 |
| 5,684,253 A * | 11/1997 | Bonne | G01L 19/0038 73/706 |
| 5,837,889 A * | 11/1998 | Slenker | A63B 47/008 73/81 |
| 6,070,470 A * | 6/2000 | Harms | G01L 17/005 24/513 |
| 7,401,527 B2 * | 7/2008 | Flaharty | B60S 1/0469 73/818 |
| 2001/0002552 A1 * | 6/2001 | Vinci | G01D 21/02 73/753 |

FOREIGN PATENT DOCUMENTS

| | | | |
|---|---|---|---|
| CN | 105710775 A | * | 6/2016 |
| DE | 102008034403 A1 | | 4/2014 |

* cited by examiner

*Primary Examiner* — Peter Macchiarolo
*Assistant Examiner* — Jermaine Jenkins
(74) *Attorney, Agent, or Firm* — Armstrong Teasdale LLP

(57) ABSTRACT

A tool for use in locating a pressure measurement device between a surface and a biasing member is provided. The tool includes a first indexing member configured to couple to a first side of the pressure measurement device, and a second indexing member configured to couple to a second opposing side of the pressure measurement device. The second indexing member includes an outer surface including a recess sized to receive at least a portion of the biasing member. The first and second indexing members are configured to be pressed between the biasing member and the surface such that the first and second indexing members compress against the pressure measurement device.

20 Claims, 5 Drawing Sheets

TOOL AND METHOD FOR USE IN MEASURING A PRESSURE INDUCED BY A BIASING MEMBER ON A SURFACE

BACKGROUND

The field of the present disclosure relates generally to diagnostic testing and, more specifically, to a tool that facilitates measuring a pressure induced by a biasing member on a surface.

At least some known commercial aircraft undergo a series of test flights before being certified for entry into service. The test flights are used to ensure assemblies on the aircraft function properly, and the functionality is verified based on test data gathered during the test flights. For example, one assembly analyzed during test flights is the windshield wiper assembly. At least some known windshield wiper assemblies are configured such that the windshield wiper presses against the windshield at a pressure within a predetermined range. The predetermined range is selected to ensure the likelihood of flight squawks caused by fluttering of the windshield wiper is reduced. When the windshield wiper presses against the windshield at a pressure outside the predetermined range, damage to the windshield or, in the alternative, flights squawks can occur.

Prior to each flight test, the windshield wiper assembly is calibrated to ensure the pressure that the windshield wiper presses against the windshield is within the predetermined range. At least one known process for calibrating the windshield wiper assembly includes connecting a fish scale device to a distal end of a windshield wiper arm, measuring the force by pulling the windshield wiper arm away from the windshield, and adjusting the assembly based on values obtained during the calibration. However, such a calibration process is a time-consuming and laborious task. Moreover, operator error can result in damage to the windshield wiper assembly or in inaccurate pressure values being obtained, which can result in flights squawks during the test flight and having to perform subsequent flights tests to verify the windshield wiper assembly is calibrated properly.

BRIEF DESCRIPTION

In one aspect, a tool for use in locating a pressure measurement device between a surface and a biasing member is provided. The tool includes a first indexing member configured to couple to a first side of the pressure measurement device, and a second indexing member configured to couple to a second opposing side of the pressure measurement device. The second indexing member includes an outer surface including a recess sized to receive at least a portion of the biasing member. The first and second indexing members are configured to be pressed between the biasing member and the surface such that the first and second indexing members compress against the pressure measurement device.

In another aspect, an assembly for use in measuring a pressure induced by a biasing member on a surface is provided. The assembly includes a pressure measurement device and a tool including a first indexing member coupled to a first side of the pressure measurement device, and a second indexing member coupled to a second opposing side of the pressure measurement device. The second indexing member includes an outer surface including a recess sized to receive at least a portion of the biasing member. The first and second indexing members are configured to be pressed between the biasing member and the surface such that the first and second indexing members compress against the pressure measurement device. The assembly also includes a display device coupled in communication with the pressure measurement device, wherein the display device is configured to display the pressure induced by the biasing member.

In yet another aspect, a method of measuring a pressure induced by a first biasing member on a surface with a pressure measurement device is provided. The method includes positioning a tool between the first biasing member and the surface, wherein the tool includes a first indexing member configured to be coupled between the surface and the pressure measurement device, and a second indexing member configured to be coupled between the biasing member and the pressure measurement device. The method also includes coupling the first indexing member to the surface, coupling the first biasing member to the second indexing member, and obtaining pressure measurements as the first and second indexing members are pressed between the first biasing member and the surface.

DETAILED DESCRIPTION

The implementations described herein relates to a tool for use in locating a pressure measurement device between a surface and a biasing member. For example, in one implementation, the surface is the surface of a windshield, and the biasing member is a windshield wiper arm. The pressure measurement device is located between the surface and the biasing member to certify a vehicle for service prior to a flight test, for example, or during periodic maintenance after the vehicle has been certified for service. In the exemplary implementation, the tool includes a first indexing member coupled to a first side of a pressure measurement device, and a second indexing member coupled to a second opposing side of the pressure measurement device. Each indexing member is shaped and includes features that enable the tool to be easily mateable with the biasing member. Moreover, the first and second indexing members have shapes that substantially mirror each other such that flipping the tool enables the pressure measurement device to be located along biasing members in different orientations. As such, the tool enables pressure measurements of the biasing member pressing against the surface to be more easily and more accurately obtained.

Figure 1:
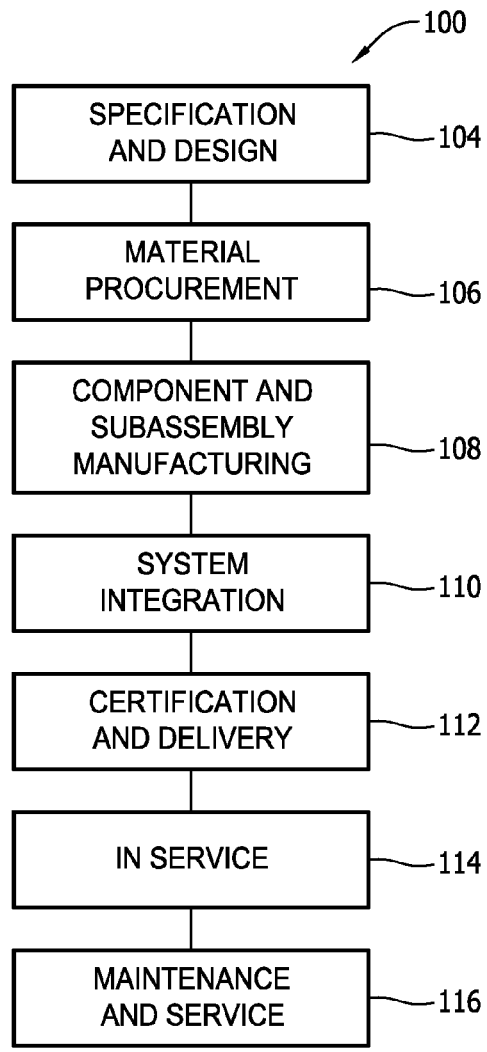
FIG. 1 is a flow diagram of an exemplary aircraft production and service method.
Figure 2:
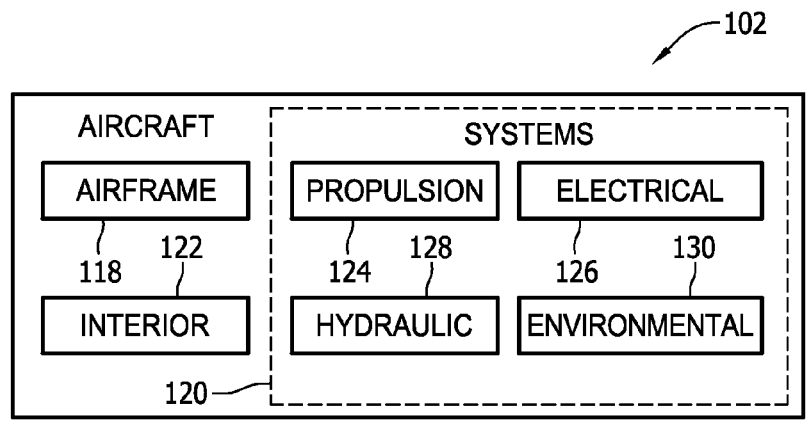
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106.

During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
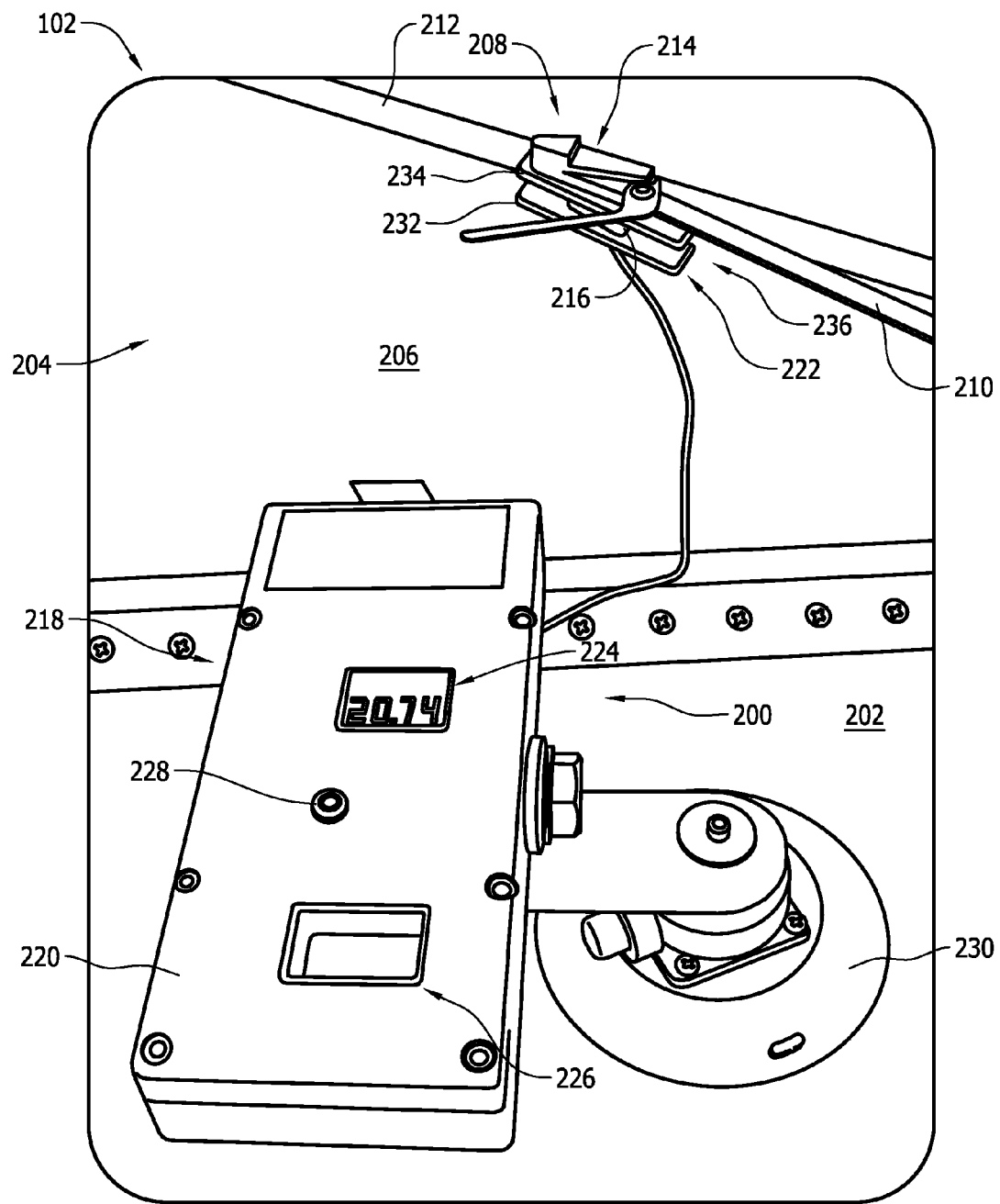
FIG. 3 is a schematic illustration of an exemplary pressure measurement assembly that may be used with the aircraft shown in FIG. 2.

FIG. 3 is a schematic illustration of an exemplary pressure measurement assembly 200 coupled to aircraft 102. In the exemplary implementation, aircraft 102 includes a fuselage 202, a windshield 204 including a surface 206, and a windshield wiper assembly 208. Windshield wiper assembly 208 includes a biasing member, such as a wiper arm 210, extending from fuselage 202, and a windshield wiper 212 coupled to wiper arm 210. More specifically, windshield wiper 212 is coupled to a distal end 214 of wiper arm 210, and wiper arm 210 biases windshield wiper 212 against windshield 204 at a predetermined pressure to ensure windshield wiper 212 remains secure against surface 206 during operation of aircraft 102.

Pressure measurement assembly 200 includes a pressure measurement device 216, a display device 218, housing 220 sized to receive display device 218, and an indexing tool 222 coupled to pressure measurement device 216. In one implementation, pressure measurement device 216 is a load cell and display device 218 is a load cell indicator. However, any pressure measurement device and display device that enables pressure measurement assembly 200 to function as described herein may be used.

Housing 220 encloses display device 218 therein, and facilitates simplifying the functionality of pressure measurement assembly 200 for use by an operator (not shown). More specifically, housing 220 is designed to ensure only predetermined functions on display device 218 are accessible by the operator. In the exemplary implementation, housing 220 includes a display window 224 and a certification window 226 defined therein, a power button 228, and an attachment feature 230. Display window 224 enables a pressure measurement values obtained by pressure measurement device 216 to be viewed by the operator, and certification window 226 enables the operator to view and verify the certification of display device 218. Power button 228 enables the operator to toggle the operability of pressure measurement assembly 200, and attachment feature 230 facilitates selectively coupling housing 220 to fuselage 202. In the exemplary implementation, attachment feature 230 is a suction-type mechanism. Moreover, in some implementations, housing 220 is designed to be a weather-proof enclosure such that display device 218 is protected from potentially adverse conditions while in use.

Indexing tool 222 includes a first indexing member 232 and a second indexing member 234 coupled on opposing sides of pressure measurement device 216. Indexing tool 222 facilitates locating pressure measurement device 216 between surface 206 and wiper arm 210. More specifically, first and second indexing members 232 and 234 include features that ensure pressure measurement device 216 is securely positioned between surface 206 and wiper arm 210 as pressure measurements are being obtained. As such, pressure measurement device 216 can obtain pressure measurements when first and second indexing members 232 and 234 are pressed between wiper arm 210 and surface 206 such that first and second indexing members 232 and 234 compress against pressure measurement device 216.

Moreover, indexing tool 222 is designed to enable pressure measurements to be obtained from wiper arms in a variety of orientations. For example, in the exemplary implementation, wiper arm 210 extends from fuselage 202 towards windshield 204 in a first direction, and aircraft 102 typically includes a second wiper arm (not shown) that extends from an opposing side of fuselage 202 in a second opposing direction. As shown in FIG. 3, when measuring a pressure induced by wiper arm 210, indexing tool 222 is in a first orientation 236 such that first indexing member 232 is positioned between surface 206 and pressure measurement device 216, and such that second indexing member 234 is positioned between pressure measurement device 216 and distal end 214 of wiper arm 210. In some implementations, first and second indexing members 232 and 234 have shapes and features that substantially mirror each other when coupled to opposing sides of pressure measurement device 216 such that indexing tool 222 can be flipped and engaged with the second wiper arm. As such, when measuring a pressure induced by the second wiper arm, indexing tool 222 is in a second orientation (not shown in FIG. 3) such that first indexing member 232 is positioned between pressure measurement device 216 and the second wiper arm, and such that second indexing member 234 is positioned between surface 206 and pressure measurement device 216.

Figure 4:
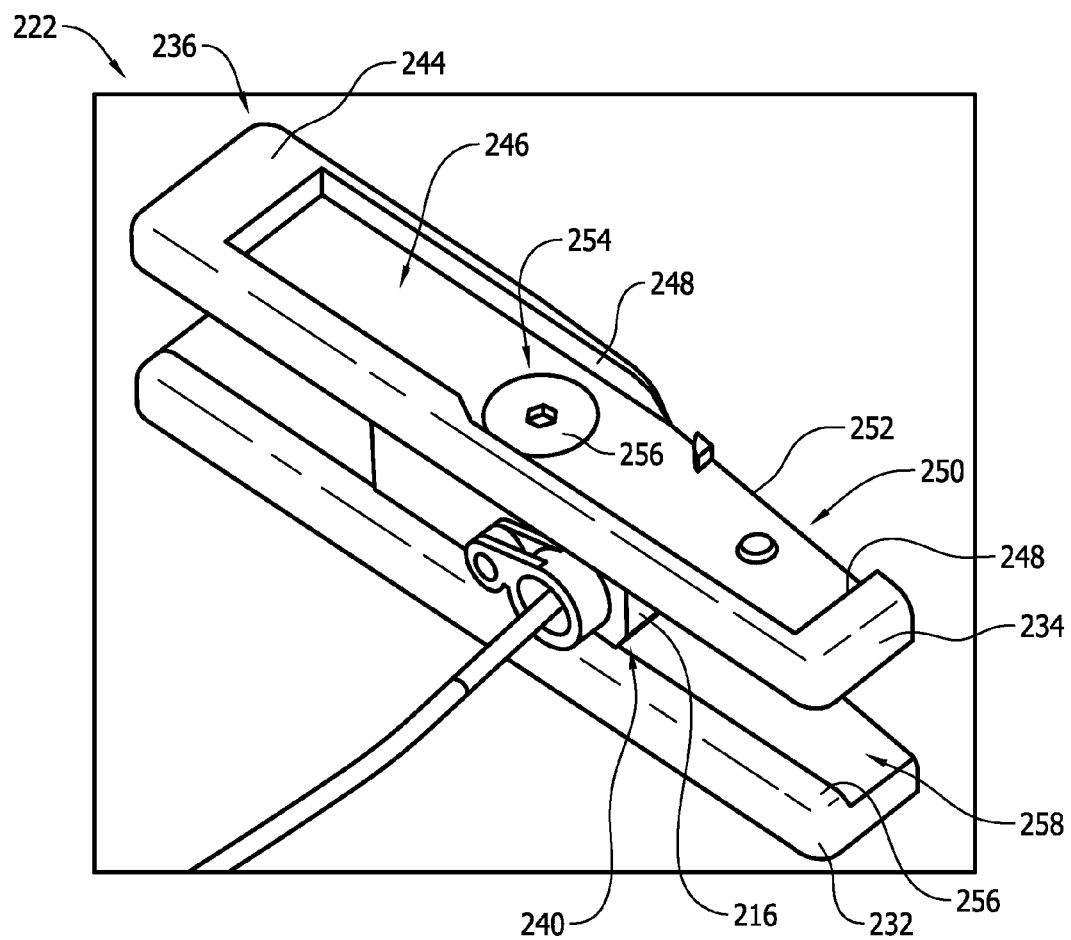
FIG. 4 is a perspective schematic illustration of an exemplary indexing tool in a first orientation that may be used with the pressure measurement assembly shown in FIG. 3.
Figure 5:
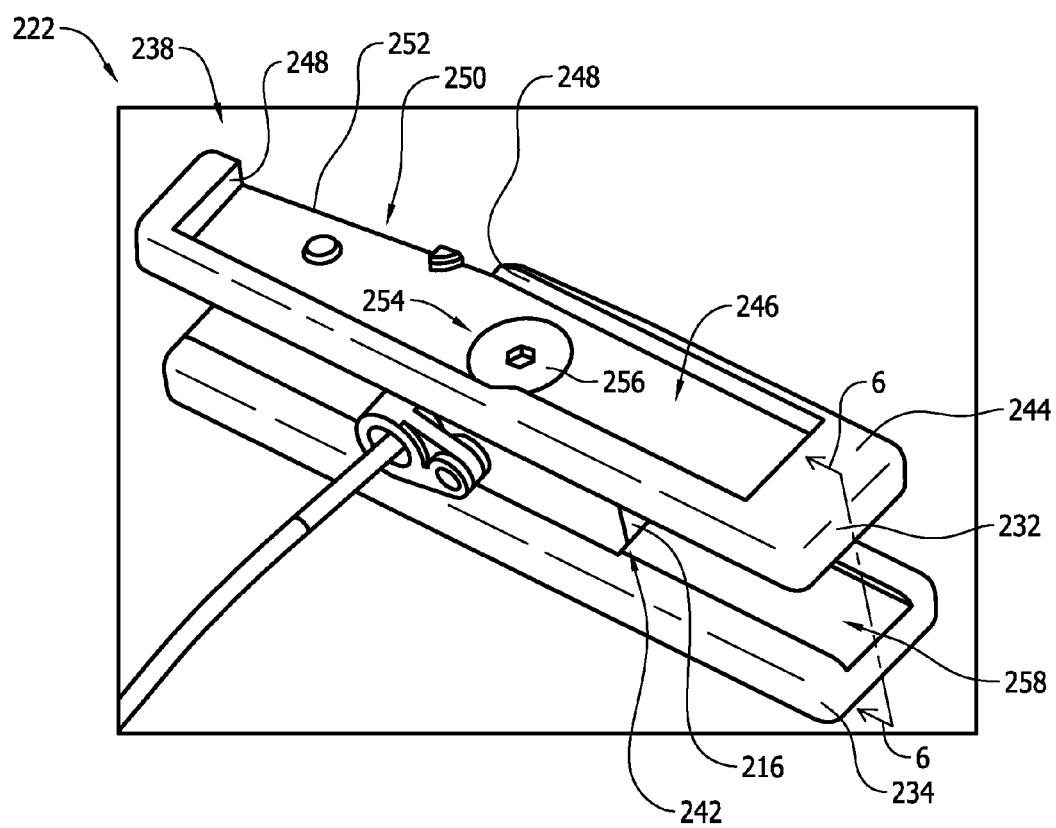
FIG. 5 is a perspective schematic illustration of the indexing tool in a second orientation.

FIG. 4 is a perspective schematic illustration of indexing tool 222 in first orientation 236, and FIG. 5 is a perspective schematic illustration of indexing tool 222 shown in a second orientation 238. In the exemplary implementation, indexing tool 222 includes first indexing member 232 coupled to a first side 240 of pressure measurement device 216, and second indexing member 234 is coupled to a second opposing side 242 of pressure measurement device 216. As described above, first and second indexing members 232 and 234 have shapes and features that substantially mirror each other when coupled to first and second sides 240 and 242 of pressure measurement device 216. As such, it should be understood that the following descriptions of either first or second indexing members 232 and 234 applies to the other indexing member as well.

Referring to FIG. 4, second indexing member 234 includes an outer surface 244 and a recess 246 defined therein. Recess 246 is sized to receive at least a portion of wiper arm 210 and, more specifically, sized to receive distal end 214 of wiper arm 210 (each shown in FIG. 3). Recess 246 has any shape that enables pressure measurement assembly 200 to function as described herein, and the shape of recess 246 is selected such that distal end 214 of wiper arm 210 mates with recess 246. For example, in the exemplary implementation, distal end 214 has a substantially rectangular profile, and the shape of recess 246 is selected to have a substantially similar rectangular profile as distal end 214. Moreover, recess 246 is sized to be at least partially oversized relative to distal end 214.

Recess 246 also forms side walls 248 in second indexing member 234. Side walls 248 extend about recess 246 and facilitate ensuring wiper arm 210 remains secured therein as pressure measurements are obtained by pressure measurement device 216. Moreover, in some implementations, a gap 250 is formed in at least one of side walls 248. Gap 250 enables a portion of wiper arm 210 extending from distal end 214 to extend from recess 246 and past an outer edge 252 of second indexing member 234. As such, forming gap 250 in side walls 248 enables distal end 214 to be fully inserted within recess 246 when obtaining pressure measurements.

Second indexing member 234 also includes a fastener opening 254 defined therein. Fastener opening 254 extends through second indexing member 234 and is sized to receive a fastener 256 therethrough. In some implementations, pressure measurement device 216 includes a coupling, such as a threaded opening (not shown), that enables fastener 256 to couple second indexing member 234 and pressure measurement device 216 together.

Indexing tool 222 and, more specifically, first and second indexing members 232 and 234 may be fabricated from any material that enables pressure measurement assembly 200 to function as described herein. For example, in the exemplary implementation, first and second indexing members 232 and 234 members are fabricated from a material having a hardness value less than a hardness value of surface 206 (shown in FIG. 3). Surface 206 of windshield 204 is generally fabricated from glass, such that the material used to fabricate first and second indexing members 232 and 234 has a hardness value of less than about 5.5 on Mohs Scale of Hardness. As such, damage to windshield 204 is facilitated to be reduced when locating pressure measurement device 216 between surface 206 and wiper arm 210.

Figure 6:
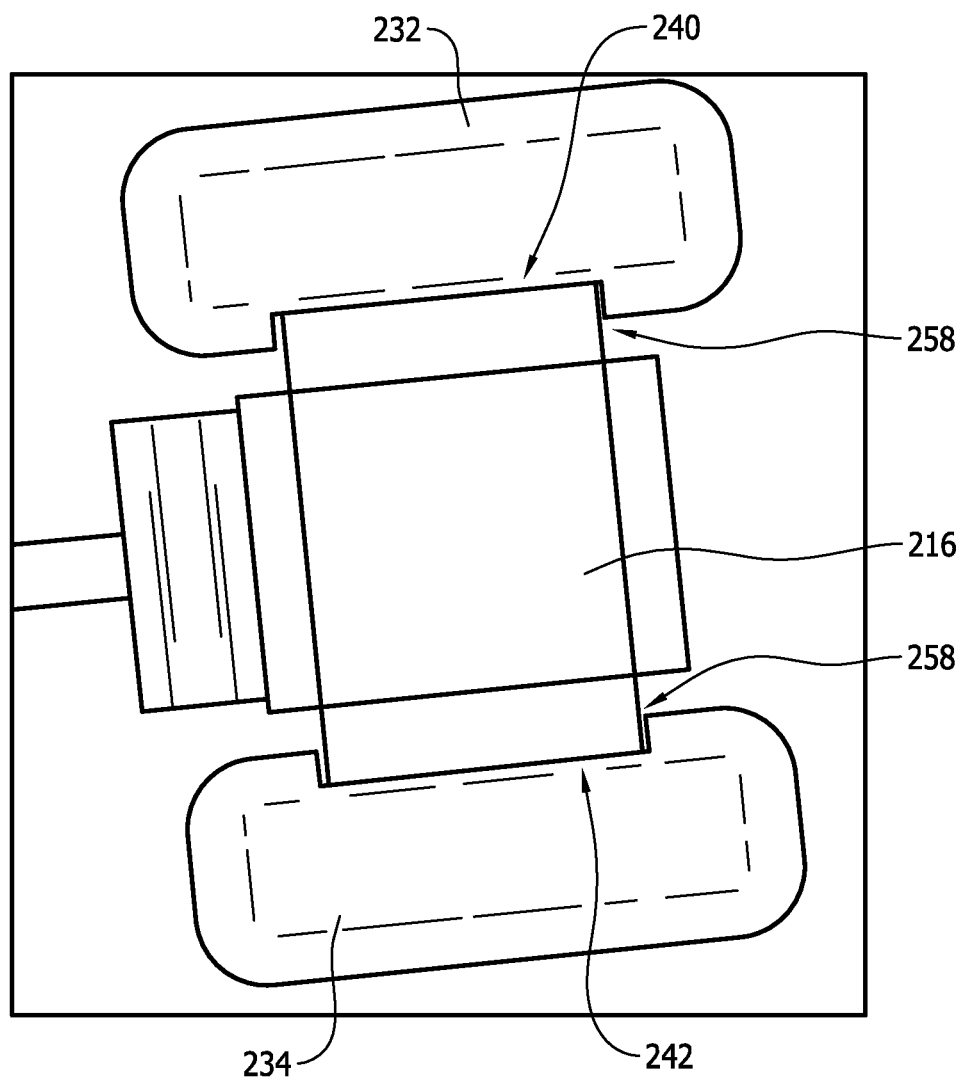
FIG. 6 is a side view schematic illustration of the indexing tool shown in FIG. 5 taken along Line 6-6.

FIG. 6 is a side view schematic illustration of tool 222 shown in FIG. 5 taken along Line 6-6. In the exemplary implementation, first and second indexing members 232 and 234 each comprise an inner surface 256 coupled to pressure measurement device 216. Specifically, inner surfaces 256 each comprise a notch 258 that extends along first and second indexing members 232 and 234. Each notch 258 is sized to receive at least a portion of pressure measurement device 216, and facilitates restricting rotation of first and second indexing members 232 and 234 relative to pressure measurement device 216.

A method of measuring a pressure induced by a first biasing member on a surface with a pressure measurement device is also provided herein. The method includes positioning a tool between the first biasing member and the surface. The tool includes a first indexing member configured to be coupled between the surface and the pressure measurement device, and a second indexing member configured to be coupled between the biasing member and the pressure measurement device. The method further includes coupling the first indexing member to the surface, coupling the first biasing member to the second indexing member, and obtaining pressure measurements as the first and second indexing members are pressed between the first biasing member and the surface.

In one implementation, coupling the first biasing member to the second indexing member includes mating the biasing member with a recess defined in an outer surface of the second indexing member. Coupling the first biasing member to the second indexing member also includes orienting the tool such that the first biasing member extends along a length of the second indexing member.

The method further includes coupling the first indexing member to a first side of the pressure measurement device, and coupling the second indexing member to a second opposing side of the pressure measurement device. Moreover, the method includes positioning the tool between a second biasing member and the surface, wherein the second biasing member extends in a different direction than the first biasing member. The second indexing member then coupled to the surface, and the second biasing member is coupled to the first indexing member.

The systems and methods described herein relate to pressure measurement devices and a tool for use in locating pressure measurement devices between a surface and a biasing member. Specifically, the tool includes first and second indexing members coupled to opposing sides of a pressure measurement device such the indexing members are positioned between the surface and the pressure measurement device, and positioned between the biasing member and the pressure measurement device. At least one of the indexing members includes a recess that mates with the biasing member as pressure measurements are obtained. Moreover, the tool is fabricated from material that facilitates reducing damage to the surface. As such, the tool described herein enables pressure measurements to be obtained in a less time-consuming and more accurate manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tool for use in locating a pressure measurement device between a surface and a biasing member configured to bias against and couple to the surface, said tool comprising:

a first indexing member configured to couple to a first side of the pressure measurement device; and a second indexing member configured to couple to a second opposing side of the pressure measurement device, wherein said second indexing member comprises an outer surface comprising a recess sized to receive at least a portion of the biasing member, wherein said first and second indexing members are configured to be pressed between the biasing member and the surface such that said first and second indexing members compress against the pressure measurement device.

2. The tool in accordance with claim 1, wherein said first and second indexing members have shapes that substantially mirror each other when coupled to the first and second opposing sides of the pressure measurement device.

3. The tool in accordance with claim 1, wherein said recess forms side walls in said second indexing member that extend about said recess, wherein a gap is formed in at least one of said side walls.

4. The tool in accordance with claim 1, wherein a shape of said recess is selected such that the at least a portion of the biasing member mates with said recess.

5. The tool in accordance with claim 4, wherein the biasing member comprises a wiper arm, said recess shaped to receive at least a portion of the wiper arm.

6. The tool in accordance with claim 1, wherein said first and second indexing members each comprise an inner surface comprising a notch sized to receive the pressure measurement device.

7. The tool in accordance with claim 1, wherein said first and second indexing members each comprise a fastener opening defined therein sized to receive a fastener therethrough.

8. An assembly for use in measuring a pressure induced on a surface by a biasing member configured to bias against and couple to the surface, said assembly comprising:
    a pressure measurement device;
    a tool comprising:
        a first indexing member coupled to a first side of the pressure measurement device; and
        a second indexing member coupled to a second opposing side of the pressure measurement device, wherein said second indexing member comprises an outer surface comprising a recess sized to receive at least a portion of the biasing member,
            wherein said first and second indexing members are configured to be pressed between the biasing member and the surface such that said first and second indexing members compress against the pressure measurement device; and
    a display device coupled in communication with said pressure measurement device, wherein said display device is configured to display the pressure induced by the biasing member.

9. The assembly in accordance with claim 8, wherein said pressure measurement device comprises a load cell.

10. The assembly in accordance with claim 8 further comprising a housing sized to receive said display device.

11. The assembly in accordance with claim 8, wherein said first and second indexing members have shapes that substantially mirror each other when coupled to the first and second opposing sides of the pressure measurement device.

12. The assembly in accordance with claim 8, wherein said recess forms side walls in said second indexing member that extend about said recess, wherein a gap is formed in at least one of said side walls.

13. The assembly in accordance with claim 8, wherein said first and second indexing members are fabricated from a material having a hardness value less than a hardness value of the surface.

14. The assembly in accordance with claim 8, wherein a shape of said recess is selected to mate with the at least a portion of the biasing member.

15. The assembly in accordance with claim 14, wherein the biasing member comprises a wiper arm, said recess shaped to receive at least a portion of the wiper arm.

16. A method of measuring a pressure induced on a surface by a first biasing member configured to bias against and couple to the surface, the pressure measured with a pressure measurement device, said method comprising:
    positioning a tool between the first biasing member and the surface, wherein the tool comprises a first indexing member configured to be coupled between the surface and the pressure measurement device, and a second indexing member configured to be coupled between the biasing member and the pressure measurement device;
    coupling the first indexing member to the surface;
    coupling the first biasing member to the second indexing member; and
    obtaining pressure measurements as the first and second indexing members are pressed between the first biasing member and the surface.

17. The method in accordance with claim 16, wherein coupling the first biasing member to the second indexing member comprises mating the first biasing member with a recess defined in an outer surface of the second indexing member.

18. The method in accordance with claim 16, wherein coupling the first biasing member to the second indexing member comprising orienting the tool such that the first biasing member extends along a length of the second indexing member.

19. The method in accordance with claim 16 further comprising:
    coupling the first indexing member to a first side of the pressure measurement device; and
    coupling the second indexing member to a second opposing side of the pressure measurement device.

20. The method in accordance with claim 16 further comprising:
    positioning the tool between a second biasing member and the surface, wherein the second biasing member extends in a different direction than the first biasing member;
    coupling the second indexing member to the surface; and
    coupling the second biasing member to the first indexing member.

* * * * *